April 4, 1961  D. VOEGTLEN  2,978,641
CIRCUIT AMBIGUITY TESTING APPARATUS
Filed Oct. 15, 1957  5 Sheets-Sheet 1

Inventor:
Dieter Voegtlen.

United States Patent Office 2,978,641
Patented Apr. 4, 1961

2,978,641
CIRCUIT AMBIGUITY TESTING APPARATUS

Dieter Voegtlen, Munich, Germany, assignor to Siemens and Halske Aktiengesellschaft Berlin and Munich, a German corporation Filed Oct. 15, 1957, Ser. No. 690,373

Claims priority, application Germany Oct. 31, 1956

10 Claims. (Cl. 324—158)

This invention is concerned with circuit ambiguity testing apparatus, that is, apparatus for testing electrical circuits to ascertain plural activation of component parts.

Circuit arrangements, for example, in communication systems including telephone systems, often contain great numbers of relays or equivalent switching elements, only one of which must at any time be in actuated position to secure proper operation of the corresponding arrangement. Such circuit arrangement may also comprise a plurality of groups of relays and each such group may be subject to the stated requirement. A plurality of circuit arrangements such as indicated may likewise be present. The proper operation of such groups of relays may be supervised by means of testing apparatus adapted to ascertain whether there is at any time more than one relay in energized actuated position. If such is the case, an indicating device will be actuated. The corresponding testing apparatus may be referred to as circuit ambiguity tester.

The various objects and features of the invention will appear in the course of the description of embodiments which will presently be rendered with reference to the accompanying drawings. In these drawings.

Figure 8:
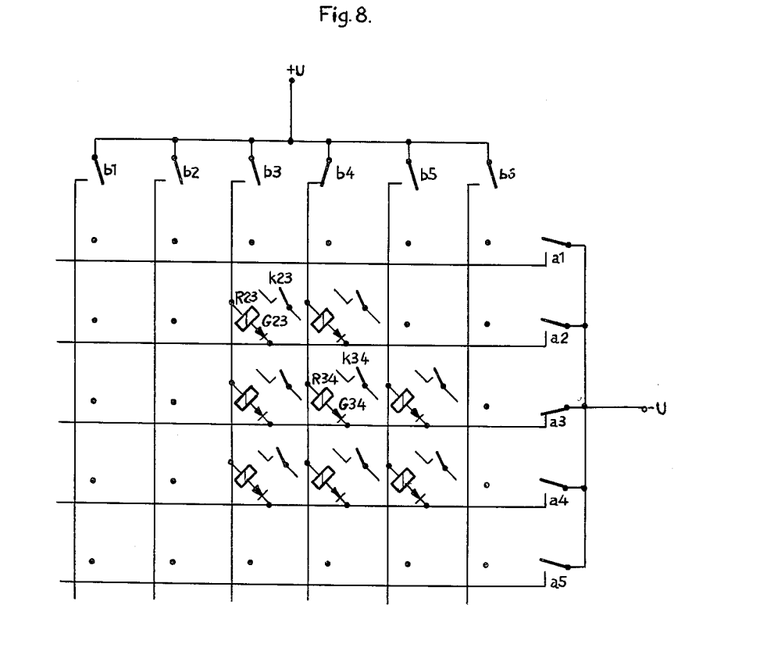
Fig. 8 shows as an example of equipment to be supervised in a telephone exchange, a known relay coupler.

The relay coupler shown schematically in Fig. 8 is employed for extending connections. It comprises coupling relays arranged in cross-field manner, some of these relays such as R23 and R34 being indicated in Fig. 8. The windings of these coupling relays are connected to conductors extending along the columns and lines of the arrangement. The conductors for the lines are connected to contacts $a1 \ldots a5$ and the conductors for the columns are connected to contacts $b1 \ldots b6$. Rectifiers are connected to the windings of the coupling relays in order to prevent in a given case energization of more than one such relay. Thus, rectifier G23 belongs to relay R23. When one of the contacts $a1 \ldots a5$ and $b1 \ldots b6$ is closed, for example, contacts $a3$ and $b4$, current will flow in the winding of coupling relay R34 from the terminal $+U$ to the terminal $-U$, and this coupling relay R34 will be energized. Energization of the other coupling relays is prevented by the blocking action of the rectifiers which are respectively associated therewith. In case a rectifier should become defective, several coupling relays will erroneously simultaneously energize. The coupling relays have contacts such as contacts $k23$, $k34 \ldots$, which are used for ascertaining whether several coupling relays have been energized. The contacts are employed for controlling the ambiguity tester.

Figure 1:
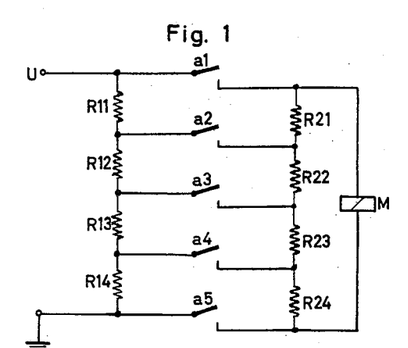
Fig. 1 shows a circuit to demonstrate the drawbacks that may occur in connection with a circuit ambiguity testing apparatus.

A simple ambiguity tester will now be described to give an example. The ambiguity tester may be constructed, for example, of relays which receive at times non-operate current, that is, current that will not effect operative actuation thereof. A corresponding circuit is shown in Fig. 1. In such circuit, certain tolerance conditions must be met for the relays, which is a disadvantage of the circuit. This will now be explained more in detail.

In the circuit according to Fig. 1, the potential difference occurring between two of the contacts which are controlled by the relays to be supervised, is evaluated so as to cause operation of the signalling or indicating element. It is assumed that the circuit is provided with five relays to be supervised. Each relay controls a test contact. These contacts are disposed between the corresponding ends and tabs of two series circuits each having identical resistors $R11 \ldots R14$ and $R21 \ldots R24$. The series circuit of resistors $R11 \ldots R14$ is fed from a direct current source with the voltage U. At the ends of series circuit of the resistors $R21 \ldots R24$ is connected an indicating relay M. In case only one single test contact is closed, relay M will not receive current since there will not be any voltage between its two terminals. However, if two of the test contacts are closed, for example, contacts $a1$ and $a2$, one of the terminals of the relay M will receive the voltage U by way of contact $a1$ and a lower voltage will appear at the other terminal of the relay M by way of resistors R24, R23, R22 and contact $a2$. Accordingly, due to the voltage difference at its terminals, current will flow through the winding of relay M causing energization thereof. The operatively effective voltage difference is in the assumed case smaller than one-fourth of the total voltage U due to the distribution of the total voltage at the series circuit of the resistors. In case contacts $a1$ and $a5$ should for example be closed, the relay M will receive the full voltage U. Accordingly, in the supervision of five relays, the voltage on the signalling or indicating relay M will fluctuate from about ¼U to U, that is, more than fourfold. If there are more than two contacts operated by the relays which are being supervised, the voltage at the indicating relay will be determined predominantly by the contacts which are in the circuit farthest apart.

This circuit has several disadvantages. Current of the same order of magnitude as in case of operative actuation will flow over the resistors $R11 \ldots R14$ even in normal condition of the relays. Moreover, the voltage on the indicating relay will fluctuate considerably dependent upon the different switching conditions, which is of disadvantage so far as the reliability of operation of these relays is concerned. The fluctuation will be the greater the more relays are to be supervised. Only a limited number of relays can be supervised with this circuit.

A known circuit (Bell Lab. Record, January 1952, volume XXX, No. 1, page 11), is provided for the solution of an analogous problem for testing whether there are more than two relays in a group of several relays in operated condition. In such circuit, the supervision is effected by means of a contact pyramid constructed of contacts which are controlled by the relays to be supervised. In this circuit, in case a relatively great number of relays is to be supervised, many contacts are connected in series and disturbances occur due to summation of the transition resistances of the contacts. Moreover, each relay to be supervised must be provided with several auxiliary contacts.

The circuit according to the invention provides for the supervision of switching devices, other switching means and other switching principles, thereby avoiding the drawbacks of the above explained circuits. The corresponding ambiguity tester employs for the supervision potential sources which are present at the switching elements or devices. The term "potential sources" is intended to mean switching points at which occur switching potentials which change at times and which may be subdivided into normal potentials and working potentials, respectively, whereby the normal potentials indicate the normal or resting position while the working potentials indicate the working condition of the corresponding potential source or rather to say of the switching element belonging to the corresponding switching point. The switching points operating as potential sources may also be represented, for example, by terminals of relay contacts, thus permitting supervision of the switching condition of the corresponding relays. In order to realize the intended supervision as to ambiguity, it must be assumed that there are potential differences of sufficient magnitude between the normal potentials on the one hand and the working potentials on the other hand. However, the normal potentials shall mutually differ only little and the same shall be the case with respect to the working potentials.

The ambiguity tester according to the invention is a tester which delivers a signal when several potential sources of a plurality of functionally associated potential sources exhibit simultaneously a predetermined switching potential. In the tester, the potential sources are arranged in the manner of an $n$-dimensional coordinate system and indicating elements are provided which respond operatively to ambiguity, such indicating elements having fewer test inputs than there are potential sources to be supervised, and those of the potential sources are by way of decoupling means connected in parallel circuit, which are arranged in a coordinate system with $n-1$ coordinate directions; accordingly, to one and the same indicating element, there are in this manner connected the potential sources which are disposed in mutually parallel extending coordinate systems with $n-1$ coordinate directions.

The number of coordinates is suitably such that the sum of all switching means for carrying out the ambiguity testing is in the various coordinate directions a minimum.

The above indicated rule will now be explained with reference to a few examples shown in the drawings.

Figure 2:
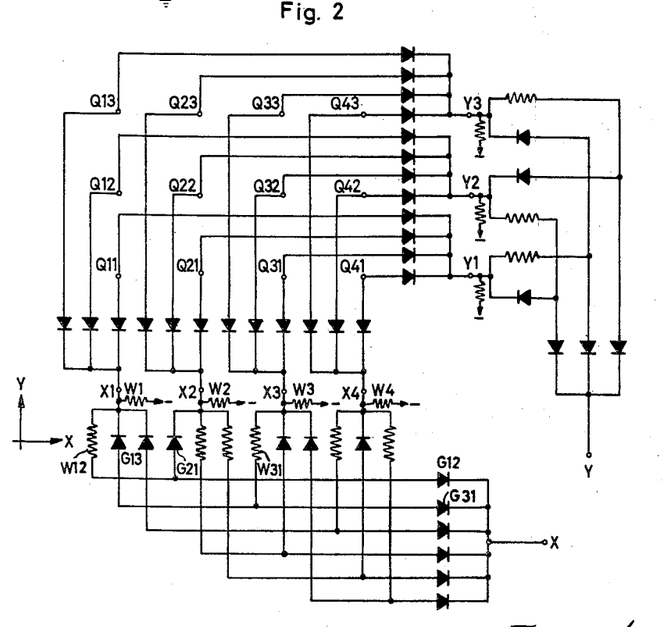
Fig. 2 represents inter alia a two dimensional arrangement for a source group with a plurality of groups in a coordinate system.

Fig. 2 shows a two dimensional arrangement for a source group having twelve points Q11, Q12, etc., in a coordinate system with two mutually rectangularly disposed coordinates X and Y. In the coordinate direction X, there are three lines with sources operating respectively with the corresponding control terminals Y1, Y2, Y3 and in the coordinate direction Y, there are four lines, with the associated sources operating respectively with the corresponding control terminals X1, X2, X3 and X4. The ambiguity testing is effected only between the terminals Y, and separately therefrom, between the terminals X. The points Q11–Q41 are respectively connected, each to one side of a contact such as $k23$, $k34$, Fig. 8, the other side of which is connected to a positive potential. Depending upon the operating condition of the corresponding relay such as R23, R34, Fig. 8, this positive potential will or will not appear as a feed potential at the respective points Q11–Q41.

An ambiguity is present if feed potential appears at least at two potential sources, that is, at least at two of the points Q11–Q41. These potential sources may be disposed in identical lines or in lines of different directions. If they are in the identical line in the X-direction, they will necessarily be in different lines in the Y-direction, and vice versa. Accordingly, they will at any rate lie in different lines of a coordinate direction. Therefore, the feed potential will in any case appear at the two terminals, in at least one coordinate direction, thereby effecting indication of the ascertained ambiguity. It is, therefore, sufficient to test for ambiguity between the control terminals Y and separately therefrom, between the control terminals X; testing between all control terminals is, accordingly, unnecessary. For example, feed or supply potentials at the sources Q13 and Q23 will produce indicating potentials at the control terminals X1 and X2; and, to give another example, feed potentials at the sources Q13 and Q22, will produce indicating potential at the terminals X1 and X2 as well as at the terminals Y3 and Y2.

It will be seen from Fig. 2 that the testing circuit shown includes coincidence circuits, each comprising a resistor and a diode rectifier. The inputs of the respective coincidence circuits are connected to the two points which are to be supervised. Thus, the coincidence circuit having the resistor W12 and the diode rectifier G21, belongs to the pair of points X1 and X2, these switching elements W12 and G21 being connected to the indicating or signalling point X by way of a decoupling rectifier G12. Similarly, the coincidence circuit comprising the elements G13 and W31 belongs to the pair of points X1 and X3, these elements being connected to the indicating or signalling point or terminal X by way of a decoupling rectifier G31. The remaining coincidence circuits are constructed similarly. Negative potential is connected to the points X1–X4 by way of resistors W1–W4, respectively.

For example, assuming that the potential source point or terminal Q11 has positive potential connected thereto by a contact such as $k23$ or $k34$ (Fig. 8), such potential will be extended, by way of the associated decoupling rectifier, to the point X1. A potential drop now occurs by way of the resistor W12, rectifier G21 and resistor W2 to the negative potential connected to the resistor W2. The decoupling rectifier accordingly receives a potential which is considerably less positive than the feed potential supplied to the point Q11. The potential appearing at the indicating or signalling terminal X will in such case be insufficient for signalling purposes. If the positive feed potential should now also appear at the source point Q21 (connected thereto by a contact such as $k23$ or $k34$ shown in Fig. 8), such potential will be effective at point X2. The negative potential on the resistor W2 is now ineffective with respect to other parts of the circuit. Accordingly, full positive feed potential will appear at the point of connection of the resistor W12 and rectifier G21 and such potential will by way of the decoupling rectifier G12 be operatively effective at the indicating or signalling terminal X. Positive feed potential appearing only at the source point Q21 will not be effective at the indicating terminal X owing to the blocking action of the rectifier G21, that is, there will not be effected an ambiguity indication. It will be seen, therefore, that the coincidence circuits bring about the necessary coincidence action.

Figure 3:
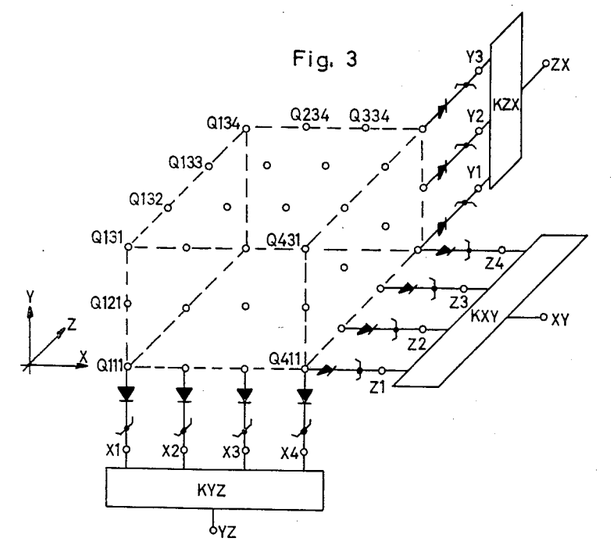
Fig. 3 illustrates a three dimensional arrangement for a source group with a plurality of groups in three mutually rectangular coordinates.

Fig. 3 shows, inter alia, a three dimensional arrangement for the potential source groups Q111, Q121, Q131, etc., with 48 sources in three mutually rectangularly disposed coordinates X, Y and Z. In the previous example, the entire arrangement was two dimensional and the arrangement of the sources operating with respect to one control terminal was single-dimensional, namely, in the form of a line and, accordingly, by one dimension lower. In the example to be now explained, the arrangement is three dimensional. Accordingly, analogous to the previous case, the arrangement of the sources operating with respect to one terminal, will be two dimensional. Therefore, several lines of a coordinate direction, that is, a line group, will operate with respect to a control terminal whose lines are transverse to the lines of a second coordinate direction. The sources operating with respect to one control terminal are, as it were, disposed upon a plate extending in two dimensions. Since there are three dimensions, three different kinds of plates may be recognized which are determined by three possible combinations, always of two of the available dimensions XYZ, that is, the combinations XY, YZ and ZX. These three plates are then arranged, always in the third dimension. The plates in the XY plane are arranged in the coordinate direction Z. Their sources operate with respect to the four terminals Z1, Z2, Z3, Z4, since the total arrangement of sources in four such plates may be subdivided. One of these plates having three lines, accordingly operates with respect to control terminal Z1. The first line comprises the sources Q111, Q211, Q311, Q411; the second line comprises the sources Q121, Q221, Q321, Q421; and the third line comprises the sources Q131, Q231, Q331, Q431. The sources of these lines operate over directional channels with respect to the terminal Z1. In Fig. 3, these channels are indicated merely schematically. The rectifier shown between the source Q411 and the control terminal Z1 indicates the channels between the sources of the first line and the corresponding control terminal. The multiple symbol shown at a point between the rectifier and the control terminal Z1 indicates the connection of the channels of the other two lines of the plate lying in the XY-plane.

The sources of the rearwardly successive plate operate in similar manner with respect to the control terminal Z2. The sources of the two remaining corresponding plates operate with respect to the control terminals Z3 and Z4.

References KYZ, KXY and KZX in Fig. 3 indicate testing circuits each constructed as explained in connection with Fig. 2.

The ambiguity testing is effected between the four terminals Z1 to Z4 by means of the testing circuit KXY. At the output XY will appear the indicating potential, at a time when at least two sources lying in two different plates deliver positive feed potential.

The sources disposed in the YZ plane operate in similar manner with respect to the control terminals X1 to X4 which feed the testing circuit KYZ having the output YZ. An indicating potential will appear in the presence of simultaneous feed potential at sources of two different plates in the YZ plane.

The sources of the plates in the ZX plane operate in similar manner with respect to the control terminals Y1, Y2 and Y3.

There are, accordingly, present the control terminals X1 to X4, Y1 to Y3 and Z1 to Z4. Completely analogous to the conditions obtaining in the previously described two-dimensional arrangement according to Fig. 2, there will occur, in the presence of feed potential at any two sources, at the control terminals for at least one coordinate direction, indicating potentials, causing indicating potential to occur at the output of the associated testing circuit, thus characterizing the ambiguity.

The basic thought concerned with the arrangement of sources may be represented independent of geometric placement. Assuming that there are $n$ sources. This number may be broken down in several whole number factors $n = p \cdot q \cdot r \ldots$. In order to make this breaking down into a predetermined number of factors at any rate possible, a few auxiliary sources may be added to the given sources, which will take the place of the resulting surplus places without having otherwise any significance. The number of coordinates now corresponds to the number of factors and the number of lines in the respectively associated coordinate direction corresponds to the magnitude of the factors. The sources of the lines and line groups, respectively, accordingly operate with respect to control terminals which form as many groups as there are factors and the number of which is in each case equal to the magnitude of the factors. Each of the $n$-sources is thereby connected, over a directional channel, always with one of the $p$ or $q$ or $r$, etc., control terminals for the corresponding coordinate direction. As already explained, several sources operate with respect to a given control terminal; the connections being, however, such that none of the $n$-sources operates at the same time with respect to one and the same terminal together with another source in all coordinate directions. The arrangement operates in this case in so-called independent coordinates.

In accordance with the explained basic thought, the subdivision or splitting may be effected in as many coordinates as desired, provided of course that there is a sufficiently great number of sources. The number of coordinates may be so great, for example, equal to four, that the arrangement can not be readily represented geometrically which, however, does stand in the way of effecting the desired subdivision.

The advantage of the splitting or subdivision resides in reduction of the number of the potential sources which are to be supervised, thus permitting the use of a simpler supervising circuit. Assuming that there are $n$-sources, after the splitting there will be, for example, $n = p \cdot q \cdot r$, only $p + q + r$ control terminals, wherein $$p+q+r < p \cdot q \cdot r$$

moreover, testing for ambiguity need be made separately only between the terminals $p$ and $q$ and $r$, respectively, which belong to the different coordinate directions.

The more coordinate directions there are provided, that is, the more factors are obtained from the splitting or subdividing of a given number of sources, the smaller will be the magnitudes of the factors and the smaller will be the number of lines. The number of terminals, will, accordingly, be reduced likewise. The number of coordinates may be made so large that only two control terminals will result for each coordinate direction. There will then result $n = 2^d$, wherein $d$ is the number of coordinate directions. Only two terminals will then control a coincidence circuit in the various coordinate directions, thus permitting the use of a simple And-coincidence circuit. A great many very simple coincidence circuits will in such case be required. On the other hand, upon splitting into at the most two coordinate directions, there will result only two groups of control terminals to be supervised. There are, however, generally always more than two terminals, requiring more complicated testing circuits for supervision. It is possible, assuming a given number of sources and given constructional form of testing circuits, to provide a splitting or subdivision resulting in a minimum of switching elements for the arrangement.

Fig. 2 shows, inter alia, examples of a coincidence circuit required in accordance with the corresponding arrangement of sources and splitting of the number thereof into two factors. The sources are, as has been described before, connected with the respectively associated control terminals by way of decoupling rectifiers which prevent mutual falsification of the potentials of the sources over the corresponding connections. To each two of the control terminals X1 to X4 there is connected a coincidence circuit comprising in known manner a series resistor connected to one control terminal and a transversely disposed rectifier connected to the other terminal, and an uncoupling rectifier disposed at the connecting point which leads to the point X delivering the indicating potential. Such And-coincidence circuits are connected between all of the different combinations of each two of the control terminals, forming altogether the testing circuit. The result is that an indicating potential will appear at point X when a source with feed potential is connected to each one of two of the control terminals.

In Fig. 3, the interconnections for the corresponding three dimensional arrangement of the sources are shown only schematically. The sources may be connected with the respectively associated control terminals analogously to the two dimensional arrangement and similar coincidence circuits may be provided therebetween. Subdivision or splitting may likewise be provided in more than three coordinate directions.

In the circuit according to Fig. 3, the star point or terminal X1 is connected with the potential sources Q111, Q121, Q131; ... Q132; ... ; ... Q134, by way of a decoupling rectifier which is connected to the corresponding potential source. There are, accordingly, connections provided for all of the potential sources which lie on the same YZ-plane. Of these decoupling rectifiers, only the one is shown in Fig. 3, which belongs to the potential source Q111. The presence of the remaining decoupling rectifiers is indicated by means of a multiple symbol at the star point or terminal X1. The star point X2 is in the circuit according to Fig. 3 in similar manner connected with the potential sources by way of decoupling rectifiers disposed in the neighboring YZ-plane to which belongs among others the potential source Q234. These connections and decoupling rectifiers are in Fig. 3 likewise indicated merely by one decoupling rectifier and a multiple symbol, so as to keep the circuit lucid and simple. To the star point X3 are in similar manner connected those potential sources which lie in the YZ-plane to which belong among others the potential source Q334, and to the star point X4 are connected those potential sources which lie in the YZ-plane to which belong among others the potential sources Q411 and Q341. To the star points X1 . . . X4 is connected the testing circuit KYZ with the output YZ. This testing circuit may, for example, be constructed exactly as the circuit part of the arrangement according to Fig. 2 which lies between the star points X1 . . . X4 and the point X. The operation of the two circuits is likewise identical.

The star points Y1 . . . Y3 are respectively connected, in analogous manner as described above, with potential sources lying respectively in the same XZ-plane, and the star points Z1 . . . Z4 are connected with potential sources lying respectively in the same XY plane. The test circuit KZX is connected with the outlet ZX to the star points Y1 . . . Y3 and the test circuit KXY is connected with the outlet XY to the star points Z1 . . . Z4. The test circuits KZX and KXY may be constructed exactly like the test circuit KYZ.

The switching elements required are resistors and diode rectifiers. If there is a certain number of sources, the switching elements required for the splitting or subdivision in different numbers of coordinates may be ascertained, using the above indicated circuits, and may be correlated. The result will be a splitting requiring a minimum of switching elements with an optimum coordination number.

Upon carrying out an arrangement of the source group resulting in many control terminal points in the individual coordinate directions, such terminal points may be treated just like the previously discussed source group, that is, also in a multi-dimensional scheme. The number of terminal points belonging to the original source group is smaller than the number of sources. These terminal points form terminal point groups belonging to different coordinate directions. These terminal point groups lie according to the arrangement thereof in a further multi-dimensional scheme of new terminal points whose number is again smaller. The latter terminal points control the coincidence circuits. Such a plural splitting or subdivision shall be referred to as plural stage splitting. In a given case, examination should be made whether a reduction of the required switching elements is possible by increase of the stages. In the example just given, the splitting is in two stages, but more than two splittings or subdivisions may be provided. The splitting may also be effected with different numbers of coordinate directions and also with different numbers of dimensions.

Figure 4:
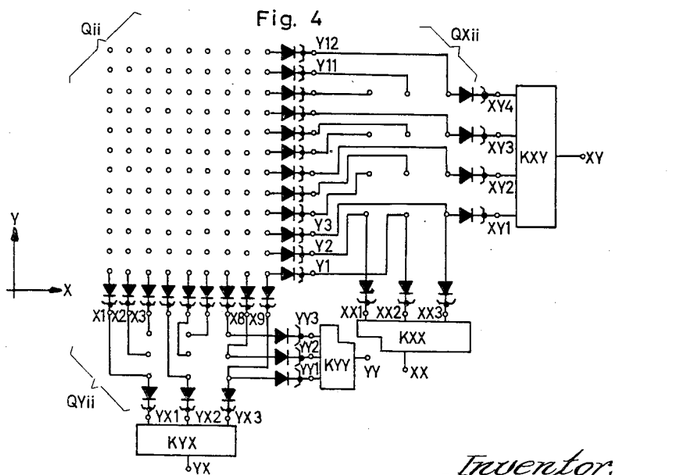
Fig. 4 indicates an example of a two-stage, two dimensional arrangement.

Fig. 4 shows an example of a two-stage embodiment with each stage in two-dimensional arrangement. The various boxes such as KXY, KXX, etc., shown in this figure indicate testing circuits each of which corresponds again to the circuit explained with reference to Fig. 2. The source group Q$ii$ with 108 sources is arranged in two mutually perpendicular coordinate directions, having for the lines in the X-direction, control terminals Y1 to Y12 and for the lines in Y-direction, control terminals X1 to X9. The terminals X1 to X12 form a control terminal group QX$ii$. This group is again analogously arranged in two coordinate directions, having for the lines in X-direction the control terminals XY1 to XY4 and for the lines in Y-direction, the control terminals XX1 to XX3. For the control terminals X1 to X9, there will result in similar manner the control terminals YY1 to YY3 and YX1 to YX3, respectively. The 108 sources to be supervised have thus been arranged so that supervision is necessary only with respect to 13 terminals which are moreover subdivided into four groups to be supervised.

It will be apparent from the foregoing explanations that it is, in the supervision of sources, especially of large number of sources, possible, to obtain with optimum subdivision or splitting in coordinate direction and subdivision in stages, an extraordinary reduction of the number of points to be supervised.

The connection of the various star points of the circuit Fig. 4, with the potential sources, shall now be described more in detail.

The star points X1 . . . X9 are respectively connected by way of decoupling rectifiers with the potential sources which are in the Y coordinate direction serially positioned. These decoupling rectifiers are respectively represented by a rectifier and a multiple symbol at the star points X1 . . . X9. The star points Y1 . . . Y12 are in similar manner respectively connected with potential sources positioned serially in the Y coordinate direction. The star points X1 . . . X9 form among themselves a group of potential sources, namely, the group QY$ii$. These potential sources are to be supervised to ascertain whether there is among them more than one working potential. As already explained, there are provided for this purpose further star points YX1 . . . YX3 and YY1 . . . YY3. The star points YX1 . . . YX3 are respectively connected over decoupling rectifiers with those potential sources which are positioned serially in Y coordinate direction, and the star points YY1 . . . YY3 are respectively connected over decoupling rectifiers with those potential sources which are serially positioned in X coordinate direction. Thus, for example, the star point YX1 is in this manner connected with the star points X1, X2 and X3, etc. All these decoupling rectifiers are respectively represented by a decoupling rectifier and a multiple symbol at each of the further star points YX1 . . . YX3 and YY1 . . . YY3. To the star points YX1 . . . YX3 is connected the test circuit KYX with the outlet point YX and to the star points YY1 . . . YY3 is connected the test circuit KYY with the outlet point YY. These circuits are, for example, constructed exactly like the circuit part of Fig. 2, already several times referred to and explained, extending in Fig. 2 between the star points X1 . . . X4 and the point X.

The group of star points QX$ii$, consisting of the star points Y1 . . . Y12 is connected with the further star points XX1 . . . XX3 and XY1 . . . XY4 exactly analogous to the manner in which the star point QY$ii$ are connected with the star points YX1 . . . YX3 and YY1 . . . YY3. The test circuit is connected to the star points XX1 . . . XX3 with the outlet point XX and the test circuit KXY is connected with the star points XY1 . . . XY4 with the outlet point XY. The test circuits KXX and KXY may be constructed exactly like the test circuits KYX and KYY.

Operations may now be briefly described which occur, for example, when two potential sources of the source group Q$ii$ have working potential. This working potential is positive against the normal potential. It is assumed, for example, that those potential sources are involved to which are connected the illustrated rectifiers leading to the star points X1 and X2. The positive working potential becomes in such case effective with respect to the star points X1 and X2 over the rectifiers referred to from where it reaches the star points YX1, YY1 and YY2. The test circuit KYY is accordingly marked at both inputs to which the star points YY1 and YY2 are connected. Accordingly, as already previously mentioned, the working potential will appear the output YY of the test circuit KYY and will thus indicate and signal that more than one potential source of the group Q$ii$ has working potential.

The principle employed in ambiguity testing, of testing the elements to be supervised in coordinate manner, thereby simplifying the testing, may also be successfully used in connection with elements represented by relays having contacts which are available for the purpose. The corresponding contacts will then control the testing means extending in case of the above described embodiments from the corresponding potential sources. A further saving of testing means may be obtained if each relay has several contacts available for testing purposes. This will be apparent from the following considerations.

In the previously explained embodiments, each potential source is connected with a control terminal in each coordinate direction. However, in case of relays, make contacts may be provided which are on one side connected with a feed potential and adapted to extend this potential further. If there are in the case of each relay as many contacts available as there are coordinate directions, there will be in each direction an individual contact therefor. Accordingly, directional channels will not be necessary and elements such as decoupling rectifiers, leading to the control terminals, may be omitted. Assuming that there is, in such arrangement, one relay energized, the make contacts controlled by such relay connect the feed potential each to one control terminal for each coordinate direction. Since the various terminals in the respective coordinate directions are not interconnected, there will not be a second control terminal in any coordinate direction that delivers feed potential; and since individual make contacts are provided for the different coordinate directions, a terminal having feed potential connected thereto will not affect another terminal in another coordinate direction which is free of feed potential. Accordingly, there can not occur, in the other coordinate direction, a terminal with feed potential connected thereto. However, if the contacts of a second relay are at the same time actuated, there will be feed potential on a second terminal in at least one group. At the output of the corresponding coincidence circuit, there will then appear an indicating potential, thus signifying ambiguity. It will be appreciated, therefore, that the arrangement operates, despite the elimination of the directional means, as direct and as unequivocal as the first described arrangements.

As noted before, coincidence circuits may be used which comprise two structural elements, namely, a rectifier and a resistor. Other coincidence units may, however, be employed. For example, in the case of supervising relays having, respectively, for each coordinate direction individual contacts, a testing device comprising two transformers may be particularly advantageously used for ascertaining ambiguities at the terminals belonging to the various coordinate directions.

For a better understanding of the invention, ambiguity testing making use of two transformers will be described first with reference to Fig. 5.

The corresponding circuit comprises a chain or series arrangement K1 of two transformers T1 and T2 provided with taps on the inner windings, which are respectively interconnected over make contacts $a$1 to $a$4 respectively controlled by relays to be supervised. The ratio of the number of turns of any two winding sections of one transformer is equal to the ratio of number of turns in the corresponding section of the other transformer. An alternating current of suitable frequency is conducted to the input of transformer T1. An indicating device such, for example, as a tube V connected to the output of transformer T2, that is, the secondary winding of the transformer T2, will be energized in the event that two or more contacts are actuated.

Assuming two contacts, for example, contacts $a$1 and $a$2 to be actuated, the secondary winding of transformer T1 will deliver a predetermined alternating voltage. Identical voltage will appear at the taps interconnected by the closed relay contacts. At the taps connected with the non-operated or open relay contacts will be the same voltage due to identical ratio of winding turns of the corresponding winding sections. Accordingly, two other contacts may be closed without effecting a change in the voltage conducted to the indicating element. It follows, therefore, that the same voltage will appear at the secondary winding of transformer T2 even when more than two contacts are closed. However, if only one contact is closed, no current will flow in the primary winding of the transformer T2 and no current will therefore be induced in the secondary winding.

Figure 5:
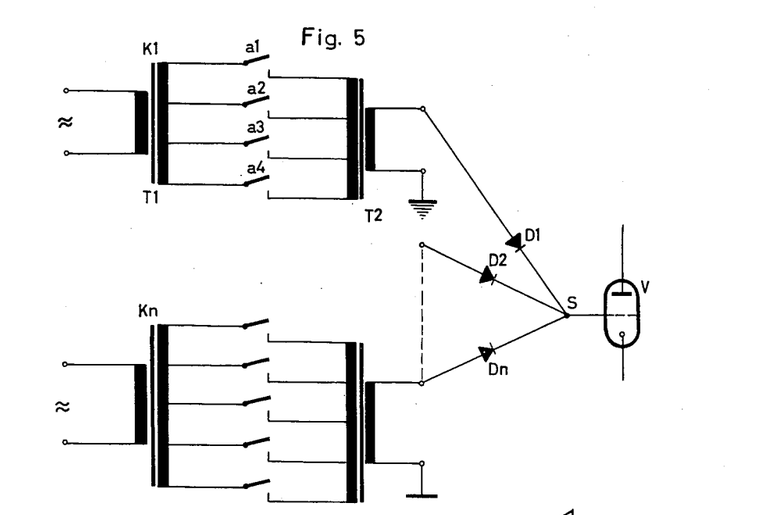
Fig. 5 shows a circuit arrangement comprising indicating means to which are connected a plurality of chain circuits for independent groups of relays to be supervised.

In Fig. 5, a plurality of chain circuits for independent groups of relays to be supervised, are connected with the indicating device V. The control grid S of the indicating tube V is connected with the outputs of chain circuits K1 to K$n$ over decoupling rectifiers D1 to D$n$. The indicating tube V may be an amplifier tube supplied with operating voltages such, that it becomes conductive responsive to positive half waves of the alternating current received from the outputs of the chain circuits, thus effecting indication. The arrangement is, accordingly, adapted for the supervision of a plurality of groups comprising numerous relays.

The properties of a plural dimensional arrangement of elements to be supervised, particularly of relays provided with contacts, and of an ambiguity testing device with chain circuits of transformers, supplement each other in advantageous manner, making it possible to supervise, with relatively small expenditure, a great number of such elements.

Figure 6:
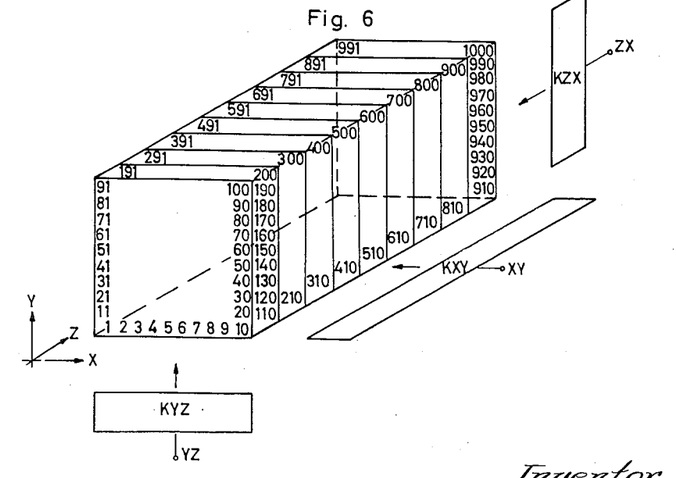
Fig. 6 illustrates in schematic manner an example of a circuit ambiguity tester for supervising 1000 relays.

The construction of such an ambiguity tester shall now be explained with reference to Fig. 6, showing in schematic manner 1000 relays, each having three make contacts for purposes of the testing. The 1000 relays are arranged in a three dimensional scheme corresponding to a number cube. The relays are merely indicated by numbers. Along the edges of the cube are positioned, in each case, ten relays, thus providing for a splitting or subdivision 1000=10·10·10. There will accordingly be ten control terminal points in each of the three coordinate directions, and 100 relay contacts will operate with respect to each terminal point. The corresponding relationships are apparent from Fig. 6. There are for each coordinate direction contacts available, and this fact makes it possible to use for the testing transformer chain circuits. The boxes marked KYZ, KXY and KZX indicate test circuits corresponding functionally to the circuit explained in connection with Fig. 2.

The cube with the XYZ-coordinate directions, formed by the relay arrangement, may be considered in the nature of ten plates lying in the XY-plane and in the Z-direction. The first plate comprises the relays 1 to 10, 11 to 20, etc. and 91 to 100. These relays operate with respect to one control terminal point. Since there are for each coordinate direction special make contacts instead of potential sources, and since these contacts are to establish connections between the taps of two transformers, they may be disposed in parallel relationship intermediate of the corresponding transformer taps. The resulting parallel circuit will perform the functions of a control terminal. The second plate comprises the relays 101 to 110, 111 to 120, etc. and 191 to 200. The corresponding contacts are in similar manner again parallel connected and disposed between corresponding taps of two transformers of a chain circuit. Since there are ten plates in the Z-direction, there will be provided ten such parallel circuits. The last such circuit will comprise the contacts of the relays 901 to 910, 911 to 920, etc. and 991 to 1000. The chain circuit belonging to these ten plates with their ten control terminals is schematically indicated Fig. 6 at KXY.

Figure 7:
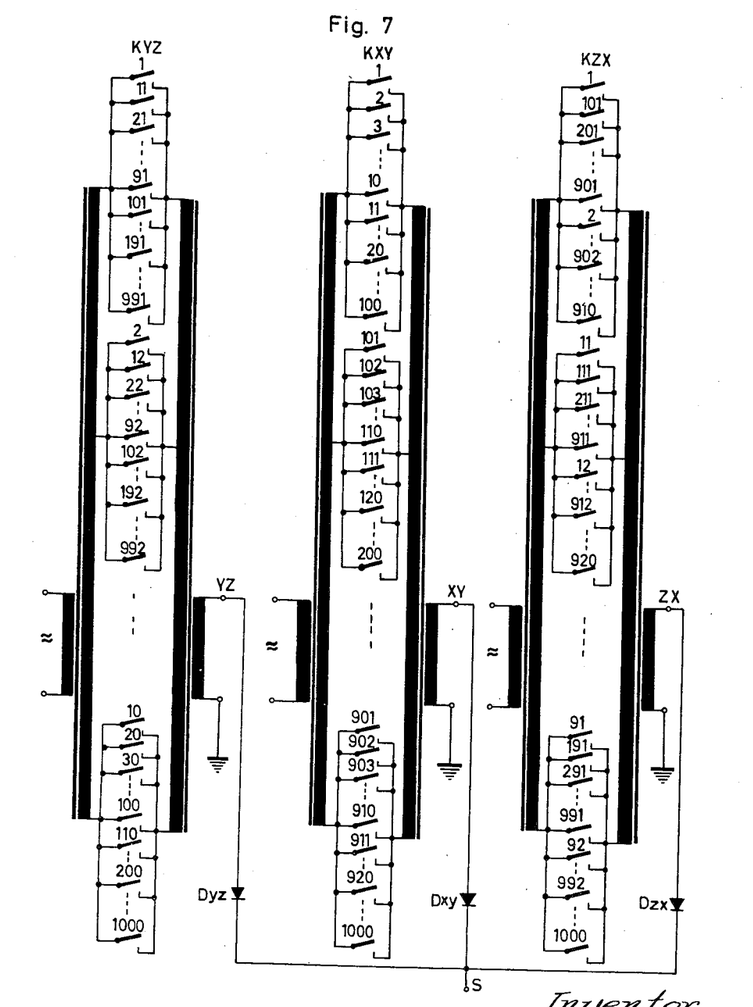
Fig. 7 shows inter alia the construction of a chain circuit.

Fig. 7 shows inter alia a constructional example of the chain circuit KXY of Fig. 6. The output XY operates by way of a diode D$xy$ with respect to a control terminal S which may be connected with an indicating device.

The ten groups of relays belonging to the ten plates lying in the YZ planes arranged in the X-coordinate direction control in analogous manner a testing device KYZ. Make contacts of relays, the second contacts, are again parallel connected in hundreds groups between corresponding taps of transformers.

In Fig. 7, the first parallel circuit includes the relays, 1, 11, 21 to 91, 101, 111 to 191 etc. and 901, 911 to 991; the second parallel circuit includes the relays 2, 12, 22 to 92, 102, 112 to 192 etc. and 902, 912 to 992; and the last parallel circuit includes the contacts 10, 20, 30 to 100, 110, 120 to 200 etc. and 900, 920 to 1000. The second relay contacts are thus included in this coordinate direction. The output YZ of this chain circuit is connected to the indicating terminal S by way of a rectifier D$yz$.

The groups of relays belonging to the ten plates and disposed in the ZX-plane and in the Y-direction, which is the last coordinate direction to be considered, each group comprising ten relays, control the chain device KZX, also shown in Fig. 7. The first parallel circuit in this chain accordingly includes relays 1, 101, 201 to 901, 2, 102, 202 to 902 etc. and 10, 110, 210 to 910; the second parallel circuit includes the relays 11, 111, 211 to 911 and in addition, 12, 112, 212 to 912 etc. and 20, 120, 220 to 920; finally, the tenth parallel circuit includes the relays 91, 191, 291 to 991 and 92, 192, to 992 etc. and 100 and 200 to 1000. The third contacts of the 1000 relays, which are provided especially for this coordinate circuit are thus accounted for. The output ZX is connected with the control terminal S by way of a rectifier D$zx$.

The 3000 special make contacts of the 1000 relays are in the above explained manner disposed in the three chain circuits.

The operation of the ambiguity testing apparatus according to Figs. 6 and 7 shall now be explained, assuming that relays 5 and 749 are energized and the three contacts of each of these relays accordingly closed. These contacts are disposed in the various chain circuits between the taps of the corresponding transformers. There are in each chain ten parallel circuits extending, as seen in Fig. 7, in predetermined sequence from top to bottom between the corresponding windings of the respective transformers. As described before, each parallel circuit contains 100 contacts belonging in accordance with the three dimensional scheme always to ten lines. Corresponding to ten lines, there are in each parallel circuit of 100 contacts ten groups of contacts which are, as shown in Fig. 7 and as previously described, disposed in predetermined succession. Each of these contact groups comprises ten contacts which are positioned according to numerical designations of the corresponding relays; accordingly, as shown in Fig. 7, the contacts of low numbered relays are at the top and those of the high numbered relays are at the bottom.

Having assumed that the relay numbered 5 has been energized and has put its three control contacts in actuated positions, the first of these contacts will be disposed in the chain circuit KXY, in the fifth place of the first group of the first parallel circuit; the second contact will be in the chain circuit KYZ, in the first place of the fifth group of the fifth parallel circuit; and the third contact will appear in the chain circuit KZX, in the first place of the fifth group of the first parallel circuit thereof. Having further assumed that relay 749 has been energized and has put its three control contacts in actuated positions, one of these contacts will be in the chain circuit KXY, in the ninth place of the fifth group of the eighth parallel circuit; another of these contacts will be in the chain circuit KYZ, in the fifth place of the eighth group of the ninth parallel circuit; and the third contact will appear in eighth place of the ninth group of the fifth parallel circuit of the chain circuit KZX.

It will be seen from the above explanations given with reference to an example assuming two relays to be operated, that the control contacts of these relays, provided for and serving ambiguity testing, are disposed in each chain circuit of the testing apparatus in respectively different parallel circuits thereof. It will further be realized, recalling the explanations given with reference to the previously described figures, for example, Fig. 5, that simultaneous closure of the control contacts of the corresponding relays will cause each chain circuit to deliver an indicating potential to the indicator terminal S appearing at the bottom of Fig. 7.

Changes may be made within the scope and spirit of the appended claims.

I claim:

1. Ambiguity testing apparatus for signalling the simultaneous presence of a predetermined switching potential at a plurality of functionally interrelated potential sources, such simultaneous presence of said predetermined potential denoting an ambiguity condition, comprising means for arranging said potential sources in the manner of a coordinate system extending in a desired number of coordinate directions, a plurality of testing devices operatively responsive to the presence of ambiguity condition, means forming a plurality of test inputs for said testing devices, the number of test inputs of all testing devices being lower than the number of potential sources arranged in said coordinate system, switching means, including decoupling switching means operatively associated with the respective test inputs for connecting thereto those of the potential sources which are arranged in a coordinate of said system, and ambiguity signalling means controlled by the respective testing devices.

2. Apparatus according to claim 1, comprising terminal means for said potential sources.

3. Apparatus according to claim 1, comprising terminals of relays connected to said potential sources.

4. Apparatus according to claim 1, wherein the number of coordinates provides for a minimum sum of said testing devices.

5. Apparatus according to claim 2, comprising means forming control terminals, decoupling means for connecting the potential sources of a coordinate direction with one of said control terminals, a plurality of And-coincidence circuits, means for connecting each of said coincidence circuits respectively to pairs of said control terminals of identical coordinate direction in any possible combination of said terminals, decoupling means for the output of each coincidence circuit, and means for connecting said decoupling means with a common terminal to feed thereto a potential responsive to feed potential at at least two of said control terminals.

6. Apparatus according to claim 3, comprising means forming control terminals, decoupling means for connecting the potential sources of said relays with one of said control terminals, a plurality of And-coincidence circuits, means for connecting each of said coincidence circuits respectively to pairs of said control terminals of identical coordinate direction in any possible combination of said terminals, decoupling means for the output of each coincidence circuit, and means for connecting said decoupling means with a common terminal to feed thereto a potential responsive to said predetermined potential at at least two of said control terminals.

7. Apparatus according to claim 2, comprising relays respectively supplied by said potential sources, said relays having test control contacts respectively operated thereby for governing said testing devices.

8. Apparatus according to claim 3, comprising test control contact means controlled by said relays for governing the operation of said switching means.

9. Apparatus according to claim 7, wherein each relay comprises a number of test control contacts corresponding to the number of coordinate directions, means for connecting in parallel test control contacts belonging respectively to predetermined relays, a testing device for each parallel test contact circuit, said testing device comprising two transformers having windings provided with taps, said taps being interconnected by said parallel test contact circuits, the ratio of number of turns of any two winding sections of one transformer corresponding to the ratio of number of turns in the corresponding winding sections of the other transformer, means for connecting to the input of said transformers an alternating voltage, and an indicating device connected with the output of said transformers, simultaneous actuation of at least two test control contacts causing interconnection of said transformer windings to effect actuation of said indicating device.

10. Apparatus according to claim 8, wherein each relay comprises a number of test control contacts corresponding to the number of coordinate directions, means for connecting in parallel test control contacts belonging respectively to predetermined relays, a testing device for each parallel test contact circuit, said testing device comprising two transformers having windings provided with taps, said taps being interconnected by said parallel test contact circuits, the ratio of number of turns of any two winding sections of one transformer corresponding to the ratio of number of turns in the corresponding winding sections of the other transformer, means for connecting to the input of said transformers an alternating voltage, and an indicating device connected with the output of said transformers, simultaneous actuation of at least two test control contacts causing interconnection of said transformer windings to effect actuation of said indicating device.

References Cited in the file of this patent
UNITED STATES PATENTS

| | | |
|---|---|---|
| 2,244,700 | Horton | June 10, 1941 |
| 2,547,011 | Jacobsen | Apr. 3, 1951 |
| 2,648,725 | Wright et al. | Aug. 11, 1953 |
| 2,686,222 | Walker et al. | Aug. 10, 1954 |
| 2,740,949 | Courihan et al. | Apr. 3, 1956 |